United States Patent
Jürs et al.

(10) Patent No.: US 7,081,713 B2
(45) Date of Patent: Jul. 25, 2006

(54) LIGHT GRID FOR DETECTING OBJECTS IN A MONITORING REGION

(75) Inventors: Heiner Jürs, Waldkirch (DE); Otto Görnemann, Kaarst (DE)

(73) Assignee: Sick AG, Waldkirch (DE)

( * ) Notice: Subject to any disclaimer, the term of this patent is extended or adjusted under 35 U.S.C. 154(b) by 642 days.

(21) Appl. No.: 09/900,000

(22) Filed: Jul. 6, 2001

(65) Prior Publication Data

US 2002/0047633 A1    Apr. 25, 2002

(30) Foreign Application Priority Data

Jul. 7, 2000    (DE) ................................ 100 33 077

(51) Int. Cl.
*H01J 1/60* (2006.01)
(52) U.S. Cl. .................. 315/134; 250/221; 340/556
(58) Field of Classification Search ................ 315/129, 315/134, 136; 250/221; 340/506, 541, 555–556
See application file for complete search history.

(56) References Cited

U.S. PATENT DOCUMENTS

| | | | | |
|---|---|---|---|---|
| 3,746,863 A | * | 7/1973 | Pronovost ................. | 250/222.1 |
| 3,805,061 A | * | 4/1974 | De Missimy et al. .... | 250/208.3 |
| 4,266,124 A | * | 5/1981 | Weber et al. ............. | 250/221 |
| 4,338,597 A | * | 7/1982 | Steiner et al. ............ | 345/213 |
| 5,130,532 A | * | 7/1992 | Clemens .................. | 250/221 |
| 5,233,185 A |   | 8/1993 | Whitaker ................. | 250/222.1 |
| 5,583,334 A | * | 12/1996 | Baumann ................ | 250/221 |
| 5,900,598 A |   | 5/1999 | Cottle et al. ............. | 187/317 |

FOREIGN PATENT DOCUMENTS

| | | |
|---|---|---|
| DE | 3939191 A1 | 5/1991 |
| DE | G9315384.8 | 3/1994 |
| DE | 29500873.3 | 4/1995 |
| DE | 195 10 304 C1 | 2/1996 |
| DE | 19837859 A1 | 3/1999 |
| DE | 199 18 921 A1 | 11/1999 |
| DE | 19835884 A1 | 2/2000 |
| DE | 19919253 A1 | 11/2000 |
| EP | 0 567 717 A1 | 11/1993 |
| EP | 0567717 A1 | 11/1993 |
| EP | 0962788 A2 | 12/1998 |

\* cited by examiner

*Primary Examiner*—Thuy Vinh Tran
(74) *Attorney, Agent, or Firm*—Townsend and Townsend and Crew LLP

(57) ABSTRACT

A light grid is provided for the detection of objects in a monitoring region having a transmitter unit comprising a plurality of light transmitters and a receiver unit comprising a plurality of light receivers in which respective pairs of light transmitters and light receivers associated with one another and bounding the monitoring region can be activated in succession in time in dependence on a synchronization signal transmitted between the transmitter unit and the receiver unit, with at least one light guide being provided for the transmission of the synchronization signal.

16 Claims, 1 Drawing Sheet

LIGHT GRID FOR DETECTING OBJECTS IN A MONITORING REGION

BACKGROUND OF THE INVENTION

The invention relates to a light grid for the detection of objects in a monitoring region having a transmitter unit comprising a plurality of light transmitters and a receiver unit comprising a plurality of light receivers in which respective pairs of light transmitters and light receivers associated with one another and bounding the monitoring region can be activated in succession in time in dependence on a synchronization signal transmitted between the transmitter unit and the receiver unit. The invention further relates to a method for the operation of such a light grid.

Light grids of this kind are used, for example, in highly automated production systems in which work pieces are automatically fed, machined and taken away again. These production systems are provided as a rule with fully automatic machining centers (e.g. robot devices) and transport devices. Since the feeding, machining and taking away regions at the same time represent possible danger regions, for example for operators, it is necessary with such systems to provide protection against non-permitted intrusion. Such protection can be achieved by means of light grids of the kind initially mentioned.

Since synchronous operation between the light transmitter and the light receiver is required for the operation of a light grid, it is usual in light grids in accordance with the state of the art to emit a synchronization signal coupled to a first monitoring signal, for example from the first light transmitter of the transmitter unit, in the direction of the first light receiver of the receiver unit in order to activate it. Subsequent to this synchronization procedure, all further pairs of light transmitters and light receivers associated with one another are then activated in succession according to a given timetable in order to thus realize the desired monitoring function. The disadvantage of this procedure is that whenever the synchronization signal is interrupted, for example by a work piece moving into the monitoring region, no synchronization can take place between the transmitter unit and the receiver unit and thus the operation of the light grid is interrupted. It is therefore customary practice to deactivate light grids for, for example, the time of the moving in and out of an object, whereby disadvantageously no protection against non-permitted intrusion exists in this time.

SUMMARY OF THE INVENTION

It is therefore an object of the invention to provide a light grid, which permits a certain and reliable synchronization between the transmitter unit and the receiver unit in, where possible, all monitoring situations, which is robust in operation and which is simple to manufacture.

This object is satisfied in accordance with a first approach of the present invention by providing at least one light guide for the transmission of the synchronization signal.

It is achieved with such an apparatus that the synchronization procedure is fully uncoupled from the transmission of the monitoring signal in the monitoring region and thus a synchronization takes place between the transmitter unit and the receiver unit which is independent of the light transmission path between the transmitter unit and the receiver unit in the monitoring region. The light guide in accordance with the invention provided separately for the transmission of the synchronization signal ensures that a reliable synchronization of the receiver unit takes place in dependence on the transmitter unit irrespective of a feed of an object into the monitoring region and irrespective of its position and movement within the monitoring region. At the same time, the transmission of the synchronization signal by means of a lead is less prone to interference such as environmental influences than in transmission by air.

A reliable protection is thus provided with the apparatus of the invention against the intrusion of non-permitted objects into the monitoring region, with a switching off of the light grid or of parts of the light grid, when an object is fed in, no longer being required. The apparatus in accordance with the invention can moreover be produced at a favorable price and is reliable and robust in operation.

Finally, the light guide provided in accordance with the invention can also be retrofitted without problem to already fitted or supplied light grids by its two ends being connected to a light transmitter of the transmitter unit and a light receiver of the receiver unit by means of suitable coupling elements.

The term light is generally not to be understood as being restricted to visible light in the present application. It is rather the case that the term light should be understood to mean generally all kinds of light and in particular all kinds of UV light, IR light and visible light.

In a preferred embodiment, the light guide is arranged outside the monitoring region and in particular at a sufficient distance to it. The lead for the transmission of the synchronization signal can be transposed so far outside the monitoring region that it is protected against outer influences such as lubrication and cutting means, metal chips, temperature effects, etc.

The light guide expediently connects the first or last light transmitter to the first or last light receiver of the transmitter units and receiver units comprising a plurality of light transmitters or light receivers respectively. All further pairs can be activated over the whole length of the light grid according to a pre-set timetable via this pair-wise allocation of light transmitter to light receiver after the activation of the first or last pair of light transmitter and light receiver. Optionally, however, a pair arranged between the first and last pairs of light transmitters and light receivers can also be connected to the light guide if this is meaningful, for example for operational reasons.

The other light transmitters/light receivers can preferably be automatically activated in succession and at defined time intervals after the transmission and reception of the synchronization signal. This means that the transmitter unit and the receiver unit are actually operated independently of one another after their activation, but synchronized with respect to one another, with the light transmitters and light receivers being automatically "switched further" until the end of the transmitter units and receiver units is reached or a non-permitted object is detected. The transmitter unit emits light signals via its light transmitters at certain time intervals and the receiver unit synchronized with the transmitter unit waits for the reception of the transmitted light signals in a corresponding region at the same point in time.

In a preferred embodiment of the invention, permitted object sizes and/or movements of an object located in the monitoring region can be programmed into or learned by the evaluation unit. Tools, for example robot arms, and the objects to be machined and their movements do not result in a switching off of the production system in these regions of the light grid defined as permitted regions. The detection of an error state only takes place with an object size or movement not previously known to the light grid system as permitted, for example a person coming in, and effects a switching off of the production system connected to the light grid.

The object initially named is further satisfied in accordance with a second approach of the present invention by transmitting the synchronization signal during operation from the transmitter unit to the receiver unit via changing pairs of light transmitters and light receivers associated with one another.

It is ensured with this method that a plurality of changing transmission paths lying in the monitoring region are available for the transmission of the synchronization signal. A certain and reliable synchronization can thus also be ensured by a selection of the light transmitter/receiver pair responsible for the transmission of the synchronization signal adapted to the respective synchronization situation when an object is located in the monitoring region. Accordingly, such a transmission path formed between a light transmitter/receiver pair will always be chosen for the synchronization signal which is momentarily not interrupted by an object.

It thus becomes possible by the change in accordance with the invention of the light transmitter/receiver pair responsible for the synchronization to move an object, for example, through the whole monitoring region of the light grid, with the light path between all light transmitters and light transmitters associated with one another being interrupted at least once since a momentarily not interrupted light path can always be used for the transmission of the synchronization signal.

It is particularly advantageous if, whenever the transmission of the synchronization signal between a first pair of light transmitter and light receiver is interrupted or such an interruption is due, a transmission of the synchronization signal takes place between a second pair of light transmitter and light receiver. This change can take place according to a fixedly programmed timetable, according to a control intervention by an operator or individually automated in dependence on specifically detected object movements. If therefore a movement of an object is determined, for example, in the direction of the light path just responsible for the synchronization signal, another light path can be selected for the transmission of the synchronization signal which was already passed by the relevant object.

A first pair responsible for the synchronization expediently consists of the respective first or last light transmitter of the transmitter unit and the respective first or last light receiver of the receiver unit and/or a second pair responsible for the synchronization of the respective last or first light transmitter of the transmitter unit and the respective last or first light receiver of the receiver unit. Different pair selections are also possible, wherein a switching over of the transmission path of the synchronization signal should take place between pairs spaced as far from one another as possible. It is, for instance, meaningful if, for example, an object is fed to the monitoring region and thus the transmission paths lying in the object entry region are blocked, for that synchronization signal transmission path, which is switched to, to be located outside this entrance region in order to ensure a reliable transmission path for the synchronization signal.

In an advantageous embodiment, a switch or alarm signal is only emitted by the light grid when a pre-set minimum number of light receivers adjacent to one another do not report a reception and an object located in the monitoring region thus exceeds a predetermined minimum size. This minimum number of light receivers required to indicate the presence of a non-permitted object in the event of a blocking of the transmission path can be programmed into or learned by a control unit in dependence on the respective monitoring situation.

It is particularly advantageous if an object not exceeding a predetermined minimum size is also detected in the monitoring region and a change in the pair of light transmitter and light receiver responsible for the transmission of the synchronization signal takes place in dependence on the position and/or the direction of movement of such an object. This means that an object entering the monitoring region is detected in every case by the light grid or its control unit, and indeed both its position and also its direction of movement, and a suitable transmission path is chosen for the synchronization signal in dependence on this information. Such a switch-over between the different transmission paths can take place by means of the control unit.

The invention is described in exemplary fashion by way of embodiments with reference to the drawings.

DESCRIPTION OF THE PREFERRED EMBODIMENTS

Figure 1:
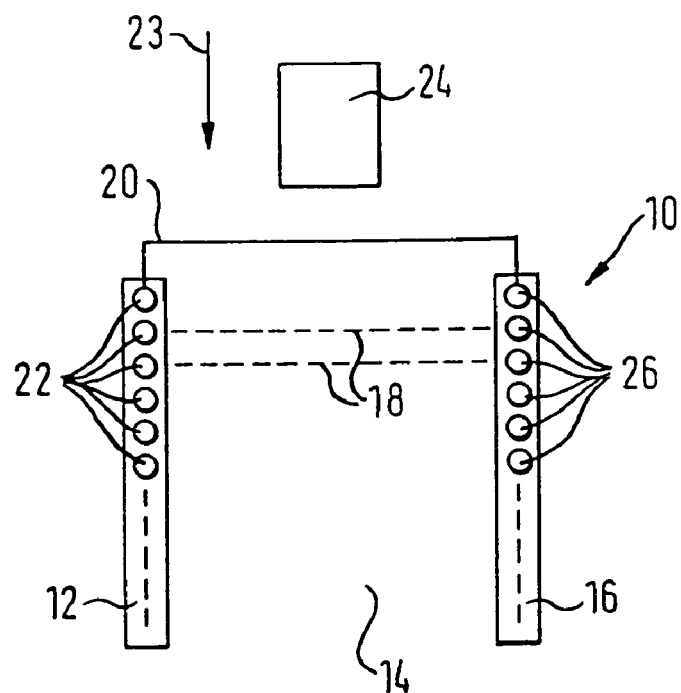
FIG. 1 is a schematic view of a light grid in accordance with a first embodiment.

A light grid 10 is shown in FIG. 1 that comprises a transmitter unit 12 and a receiver unit 16, between which a monitoring region 14 is defined. The transmission unit 12 consists of a plurality of light transmitters 22 arranged in a row, of which, however, only six light transmitters 22 are represented. The receiver unit 16 likewise consists of a plurality of light receivers 26 arranged in a row, of which likewise only six are shown.

The transmitter unit and the receiver unit 12, 16 are arranged parallel to the floor (not shown) of a production hall, with the floor extending parallel to the plane of the drawing. The length of the transmitter unit 12 and the receiver unit 16 is dimensioned such that, for example, an unrecognized passing through of the light grid 10 by persons is not possible. An approximate length of 900 mm has proved expedient in trials.

The transmitter unit 12 and the receiver unit 16 are arranged parallel to one another at an interval of around 3 to 4 m in the embodiment shown. The spacing of the transmitter unit 12 and the receiver unit 16 to the floor of the production hall depends on the respective application or the region to be protected. The transmitter unit 12 and the receiver unit 16 are, for example, arranged parallel with a spacing to the floor of 400 mm. The light transmitters 22 of the transmitter unit 12 extend in the direction of the light receivers 26 of the receiver unit 16, with an appropriately opposite light receiver 26 being associated with each light transmitter 22. Transmission paths 18 for the transmission of monitoring signals are shown between the light transmitters 22 and the light receivers 26.

A light guide laid over any path is marked by reference number 20 which connects the transmission unit 12 and the reception unit 16 to one another for the transmission of a synchronization signal. More precisely, the lead 20 in this embodiment connects the first light transmitter 22 of the transmitter unit 12 to the first light receiver 26 of the receiver unit 16. It is thus avoided that the synchronization signal has to be transmitted via a transmission path 18 of the monitoring signal, i.e. over the actual monitoring region.

The function of the light grid 10 shown is as follows:

After the first light receiver 26 of the receiver unit 16 has received a synchronization signal emitted from the first light transmitter 22 of the transmitter unit 12 and transmitted via the lead 20, the remaining light transmitters 22 and the remaining light receivers 26 are automatically activated in succession at time intervals of, for example, 100 ms. The transmitter unit 12 and the receiver unit 16 are operated independently of one another after the synchronization, with the light transmitters 22 and the light receivers 26 automatically being "switched further" in a time schedule applying equally to the light transmitters 22 and the light receivers 26 until the end of the transmitter and the receiver units 12, 16 is reached or a non-permitted object is detected.

If now an object 24 to be machined in a production system is moved, for example, in an object feed direction 23 into the monitoring region 14 of the light grid 10, the first monitoring paths 18 for the transmission of the monitoring signal are interrupted in succession. Since the object 24 passes through all transmission paths 18 in succession in the direction 22 and since during this time a synchronization of the receiver unit 16 has to take place repeatedly in dependence on the transmitter unit 12, a synchronization of the receiver unit 16 would not be possible in such a state if the synchronization were to take place via a transmission path 18. However, due to the provision of the lead 20 extending outside the monitoring region 14, the synchronization of the receiver unit 16 takes place independently of an interruption of the transmission paths 18, whereby the synchronization signal is always transmitted at any time via the lead 20 without interference in this embodiment, irrespective of where the object 24 is just located.

Figure 2:
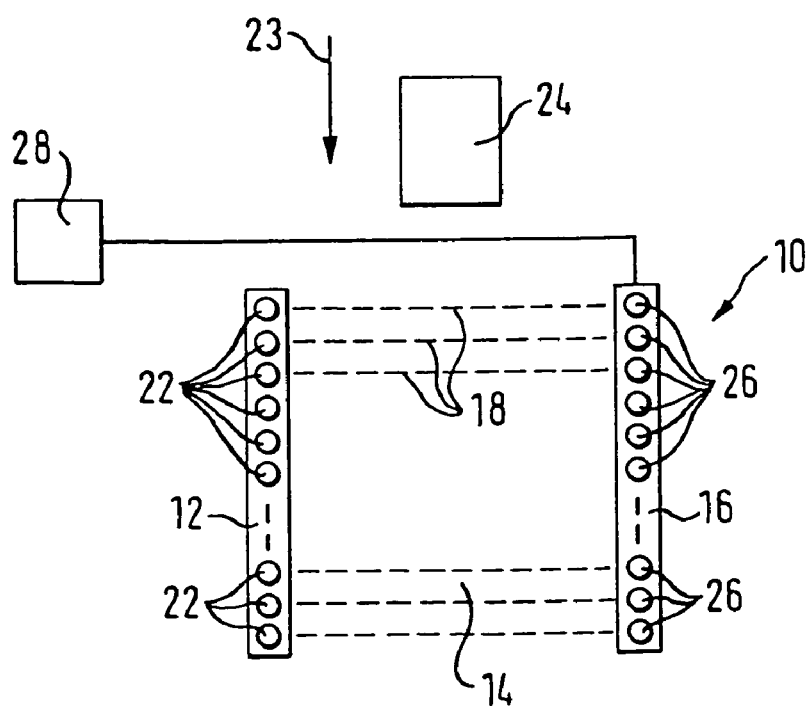
FIG. 2 is a schematic view of a light grid in accordance with a second embodiment of the invention.

In an alternative embodiment of the present invention, in accordance with FIG. 2, similar to the embodiment of FIG. 1, a light grid 10 is provided having a transmitter unit 12, a transmission region 14 and a receiver unit 16. The transmitter unit 12 comprises a plurality of light transmitters 22 and the receiver unit 16 comprises a plurality of light receivers 26. In addition, a control unit 28 is provided which is connected to the receiver unit 16 or which can alternatively also be integrated into the receiver unit 16.

The light transmitters 22 of the transmitter unit 12 are continuously clocked during the operation of the light grid 10 so that no intelligent control of the transmitter unit via the control unit 28 is required. No connection is thus advantageously required between the transmitter unit 12 and the receiver unit 16 via electrical or optical leads. Alternatively, however, the transmitter unit 12 and the receiver unit 16 can be controlled via the control unit 28 (not shown).

The control unit 28 serves, among other things, to activate the light grid 10, to evaluate received data of the receiver unit 16 and to cause the choice of a suitable transmission path 18 for the synchronization signal.

If, in accordance with FIG. 2, an object 24 to be machined is moved, for example, into the monitoring region 14 in an object feed direction 23, in turn all transmission paths 18 for the transmission of monitoring or synchronization signals are interrupted in succession. Since the receiver unit 16 cannot receive a synchronization signal emitted by the transmitter unit 12 in this state, if the transmission is to take place via a transmission path 18 interrupted by the object, the control unit 28 instructs the receiver unit 16 to receive the synchronization signal via a transmission path which is momentarily not interrupted by the object 24. In this way, alternatively to the first embodiment, an interruption of the transmission path 18 for the synchronization signal can be avoided by a suitable change of the transmission path 18 for the synchronization signal.

The invention claimed is:

1. A light grid for detecting objects in a monitoring region having a transmitter unit comprising a plurality of light transmitters and a receiver unit comprising a plurality of light receivers, respective pairs of light transmitters and light receivers associated with one another and bounding the monitoring region being activated in succession in time in dependence on a synchronization signal transmitted between the transmitter unit and the receiver unit, characterized in that at least one light guide is provided which connects the transmitter unit with the receiver unit for the transmission of the synchronization signal.

2. A light grid in accordance with claim 1, characterized in that the at least one light guide is arranged outside the monitoring region.

3. A light grid in accordance with claim 1, characterized in that the light guide connects the first or last light transmitter of the transmitter unit to the first or last light receiver of the receiver unit respectively.

4. A light grid in accordance with claim 3, characterized in that the other light transmitter and light receiver pairs are automatically activated in succession at defined time intervals after the transmission and reception of the synchronization signal.

5. A light grid in accordance with claim 1, characterized in that permitted object sizes and/or movements of an object located in the monitoring region are programmed into or learned by a control unit.

6. A method for operating a light grid to detect objects in a monitoring region, in which light signals are transmitted from a transmitter unit comprising a plurality of light transmitters to a receiver unit comprising a plurality of light receivers, with respective pairs of light transmitters and light receivers associated with one another and bounding the monitoring region being activated in succession in time in dependence on a synchronization signal transmitted between the transmitter unit and the receiver unit, characterized in that the synchronization signal is transmitted during operation from the transmitter unit to the receiver unit via changing pairs of light transmitters and light receivers associated with one another.

7. A method in accordance with claim 6, characterized in that, when the transmission of the synchronization signal between a first pair of light transmitter and light receiver is interrupted or if such an interruption is due, the transmission of the synchronization signal takes place between a second pair of light transmitter and light receiver.

8. A method in accordance with claim 6, characterized in that a first pair consists of the first or last light transmitter of the transmitter unit and the respective first or last light receiver of the receiver unit; and/or in that a second pair consists of the other last or first light transmitter of the transmitter unit and the other respective last or first light receiver of the receiver unit.

9. A method in accordance with claim 6, characterized in that a switch or alarm signal is only emitted when a predetermined minimum number of light receivers adjacent one another do not report any reception and an object located in the monitoring region thus exceeds a predetermined minimum size.

10. A method in accordance with claim 9, characterized in that an object not exceeding the predetermined minimum size is also detected in the monitoring region; and in that a change of the pair of light transmitter and light receiver responsible for the transmission of the synchronization signal takes place in dependence on a position and/or direction of movement of the object.

11. A method in accordance with claim 6, characterized in that the transmission of the synchronization signal takes place in dependence on a fixed or determined direction of object entry into the monitoring region via a first or a second pair of light transmitter and light receiver.

12. A method in accordance with claim 6 wherein the synchronization signal is transmitted only once between a light transmitter and an associated light receiver during an operating cycle of the light grid.

13. A method according to claim 12 including continuing to successively activate the pairs of associated light transmitters and light receivers during the operating cycle after the synchronization signal has been transmitted.

14. A light grid detecting objects in a monitoring region having a transmitter unit comprising a plurality of light transmitters and a receiver unit comprising a plurality of light receivers in which respective pairs of light transmitters and light receivers associated with one another and bounding the monitoring region are activated in succession in time in dependence on a synchronization signal transmitted between the transmitter unit and the receiver unit, characterized in that a control unit is provided for the transmission of the synchronization signal from the transmitter unit to the receiver unit via changing pairs of light transmitters and light receivers associated with one another.

15. A method in accordance with claim 14 wherein the synchronization signal is transmitted only once between a light transmitter and an associated light receiver during an operating cycle of the light grid.

16. A method according to claim 15 including continuing to successively activate the pairs of associated light transmitters and light receivers during the operating cycle after the synchronization signal has been transmitted.

* * * * *